United States Patent
Neff et al.

(10) Patent No.: US 7,333,873 B2
(45) Date of Patent: Feb. 19, 2008

(54) METHOD AND DEVICE FOR PROVIDING CARDS TO BE APPLIED TO A CARRIER

(75) Inventors: Monika Neff, Paderborn (DE); Rudolf Gamperling, Friedberg (DE); Stefan Estner, Augsburg (DE)

(73) Assignee: Boewe Systec AG, Augsburg (DE)

( * ) Notice: Subject to any disclaimer, the term of this patent is extended or adjusted under 35 U.S.C. 154(b) by 0 days.

(21) Appl. No.: 11/167,910

(22) Filed: Jun. 27, 2005

(65) Prior Publication Data
US 2006/0004483 A1 Jan. 5, 2006

Related U.S. Application Data

(63) Continuation of application No. PCT/EP2004/011059, filed on Oct. 4, 2004.

(30) Foreign Application Priority Data
Oct. 27, 2003 (DE) ................ 103 50 221

(51) Int. Cl.
*G06F 19/00* (2006.01)
*G06F 17/00* (2006.01)
(52) U.S. Cl. ............... 700/116; 700/115; 700/117; 700/219; 700/231
(58) Field of Classification Search .......... 700/117, 700/115, 116, 219, 231
See application file for complete search history.

(56) References Cited

U.S. PATENT DOCUMENTS

| 5,266,781 | A | 11/1993 | Warwick et al. |
| 5,715,653 | A | 2/1998 | Weinmann et al. |
| 5,974,961 | A * | 11/1999 | Kazo et al. ............... 101/4 |
| 6,431,537 | B1 * | 8/2002 | Meier ............... 271/9.01 |
| 6,446,832 | B1 * | 9/2002 | Holec et al. ............... 221/88 |
| 6,447,625 | B1 | 9/2002 | Schmid et al. |
| 6,629,006 | B1 | 9/2003 | Weinmann et al. |
| 2001/0008253 | A1 * | 7/2001 | Holec et al. ............... 235/381 |
| 2003/0088552 | A1 * | 5/2003 | Bennett et al. ............... 707/3 |
| 2003/0155370 | A1 * | 8/2003 | Martin et al. ............... 221/123 |
| 2005/0139653 | A1 | 6/2005 | Zettler et al. |

FOREIGN PATENT DOCUMENTS

| DE | 195 08 282 C1 | 3/1996 |
| DE | 195 33 444 A1 | 9/1996 |
| DE | 197 25 579 A1 | 1/1999 |
| DE | 197 34 483 A1 | 2/1999 |
| DE | 199 21 723 A1 | 11/2000 |
| DE | 101 10 414 A1 | 9/2002 |
| DE | 102 50 653 A1 | 5/2004 |
| JP | 2003 317035 | 11/2003 |

* cited by examiner

*Primary Examiner*—Ryan A. Jarrett
(74) *Attorney, Agent, or Firm*—Daniel J. Santos

(57) ABSTRACT

A method and a device for providing cards for processing first cause a drawing of a card from at least one card magazine. The cards are arranged in a plurality of card magazines and may be drawn from the same, and information regarding their card type is further associated with the cards. After drawing the card, it is output for subsequent processing together with the information regarding the card type associated with the card to allow control of the subsequent processing based on the forwarded information. Cards of a known card type are arranged in a card magazine and the information regarding the card type is associated with the card magazine, wherein the information associated with the card magazine is forwarded when drawing a card from a card magazine.

15 Claims, 16 Drawing Sheets

FIGURE 4
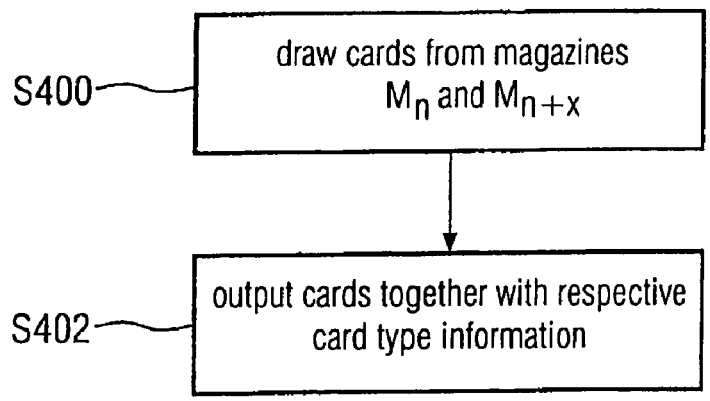
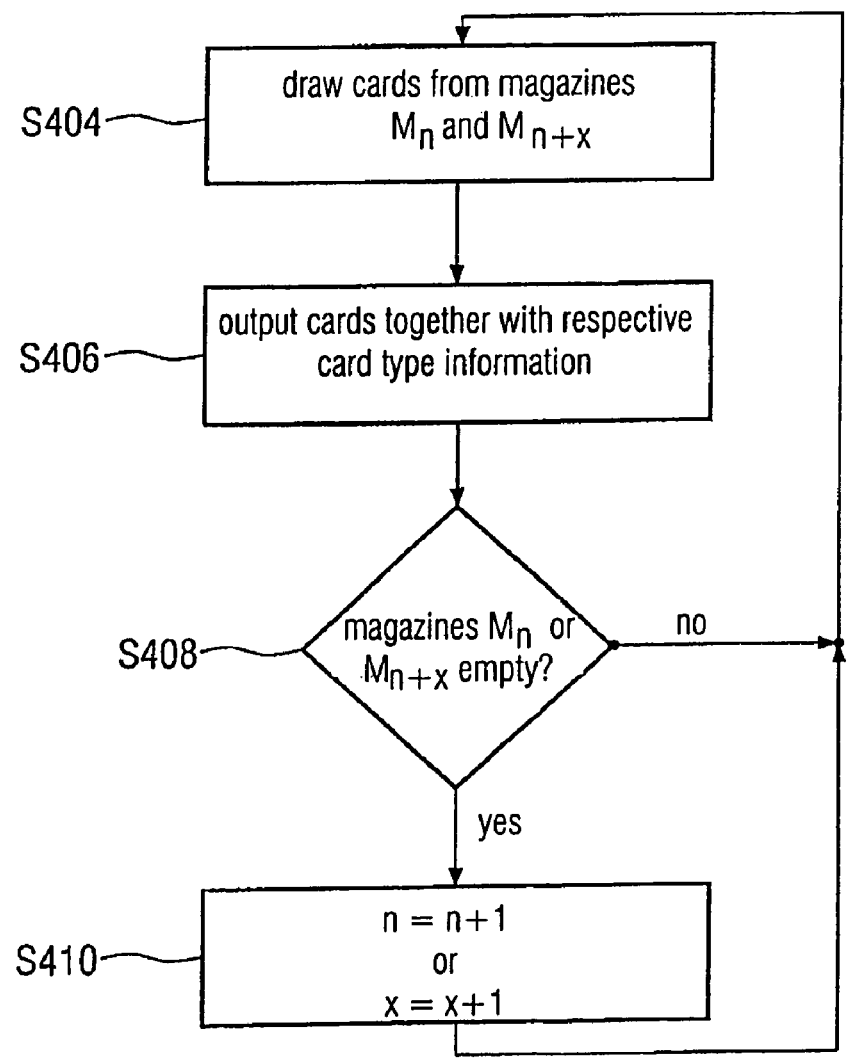

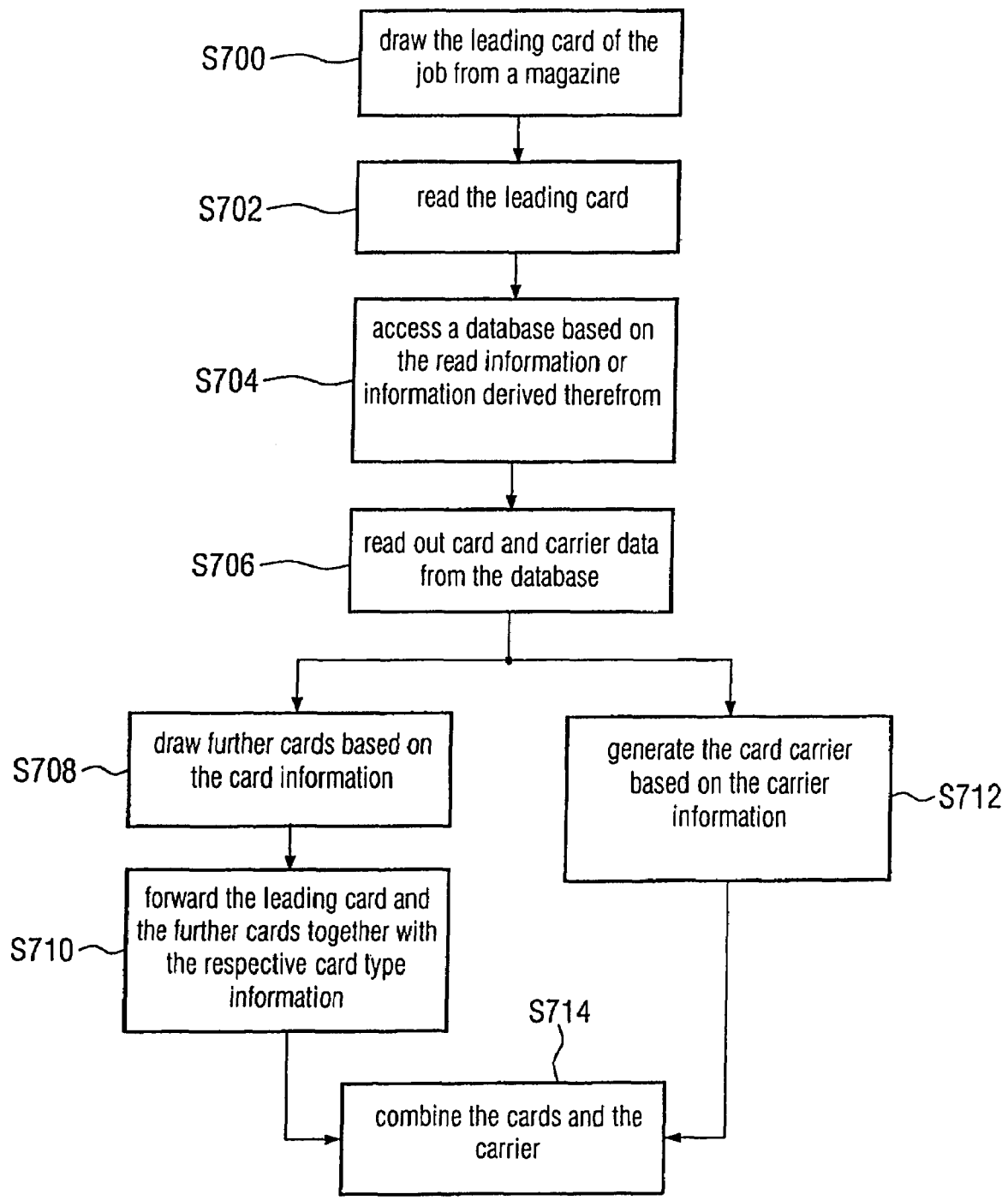

METHOD AND DEVICE FOR PROVIDING CARDS TO BE APPLIED TO A CARRIER

CROSS-REFERENCE TO RELATED APPLICATION

This application is a continuation of copending International Application No. PCT/EP2004/011059, filed on Oct. 4, 2004, which designated the United States and was not published in English and is incorporated herein by reference in its entirety.

BACKGROUND OF THE INVENTION

1. Field of the Invention

The present invention relates to a method and a device for providing cards for subsequent processing, and particularly to a method and a device for providing cards for card handling systems.

2. Description of the Related Art

Known systems for handling cards operate such that that the card, such as a thick plastic card of the type CR-80, is automatically connected (applied) to card carriers in variable number. The card carriers provided with plastic cards are then packed into envelopes in an enveloping station or are folded and sealed and subsequently supplied to further processing. In addition, any supplements may be associated with the card carriers to be enveloped and/or folded together then.

In prior art, various methods and devices for applying plastic cards and card carriers are known. From DE 195 08 282 C1 and from DE 195 33 444 A1, methods and devices are known to combine and connect plastic cards and card carriers using a print job number. After combining and connecting, the plastic carriers are enveloped and supplied to further processing. A similar method is known from DE 197 25 579 A1, in which the combination and connection of plastic cards and card carriers is verified using a check sum. A method and a device for combining and connecting plastic cards and card carriers using a job number are known from DE 197 34 483 A1, wherein processing is performed offline.

Yet another method is known from DE 102 50 653 A1, in which a card is first provided and then card data thereof are detected, wherein the card carrier is generated based on these cards.

The above known methods are the connection of card carriers and cards, wherein the cards comprise a magnetic stripe or other storage unit which may be read out by reading means, to store specific data of the card or specific data of an owner of the card. Alternatively, it is also possible to connect cards which do not obtain personalized data, but only provide general information.

In the above methods and devices known in the art, the cards are always provided by card magazines, which contain a plurality of identical cards. Various implementations of such card magazines are known, wherein the so-called revolver magazine is to be mentioned here, among others, in which a multitude of card magazines, preferably four card magazines, are arranged rotatably, wherein the cards are always drawn from one card magazine. If a card magazine has been emptied, a rotation of the revolver magazine is caused to provide a new, filled card magazine so that the overall system may be provided with cards without major interruption. Alternatively, the various card magazines may be arranged in parallel to each other, wherein the supply of the cards first starts with a first magazine and then, after it has been emptied, a second subsequent magazine is used.

The cards drawn from such card magazines are then supplied to the applier, wherein reading of the cards is preferably performed prior to applying. In the so-called card channel between the card magazine and the applier, there are preferably provided a plurality of readers to be able to read different card types. These readers include, for example, an OCR reader, such as for the detection of a bar code, a chip reader for reading out memory or processor chips on the cards, and/or a magnetic reader for reading out magnetic stripes. In addition, any other suitable readers may be provided for the detection of information from the cards. Furthermore, other devices may be provided for handling the cards, such as turners which turn the card after drawing so that a desired face of the card has a certain orientation (for example upwards).

During operation, both the applier and the card channel receive a so-called job description in the form of a file. The applier obtains information both on the number of the cards to be applied to the carrier and their positions on the carrier. The card channel is informed about the kind of cards, i.e. the card type, among other things. For example, information regarding the card type include the specification, whether it is a thick plastic card, a thin plastic card, an embossed or an unembossed plastic card. Further, information is provided specifying whether a storage medium is arranged on the card or not, wherein, in the first case, there is further specification whether the storage medium is a chip, a contactless chip, a magnetic stripe, optically detectable information or the like.

These data thus specified in the job definition are provided to the handling system, and the handling system configures the corresponding elements for processing the corresponding cards. In this context, there is, for example, a determination in the card channel which of the readers located there have to be activated for the cards to be processed and which have to be deactivated. There is further a determination which of the additionally provided card handling devices (such as turners, etc.) are to be activated/deactivated to ensure a desired handling of the received card. This is important because readers which do not generate a signal issue an error signal so that the whole system stops. In the case that, for example, a chip card is used and is guided through a magnetic stripe reader, there is no output signal of the magnetic stripe reader so that it issues an error signal which results in stopping or delaying the overall operation. In order to avoid this, an activation/deactivation of the corresponding readers in the card channel is caused via the data specified in the job definition to thus ensure suitable processing for the cards provided in the card magazine.

In the case that all magazines in the card feeder are populated with the same cards, the various magazines may automatically be processed consecutively. The processing of cards of different types is only possible with very large effort and thus reduces the system's flexibility.

A further disadvantage is that processing jobs in which cards of a different type are processed is very complex and, in the case that the number of card changes, is not possible at all. As an example, assume the case that three cards are to be applied to a card carrier, wherein a first card comprises a chip, a second card comprises a magnetic stripe, and a third card does not comprise any storage media, for example a customer card having general customer information regarding service telephone numbers or the like. In this case, it is necessary to inform the handling device in the job definition that, for each carrier, first a chip card, then a magnetic stripe card, and then a card without storage medium are provided, wherein the cards then have to be provided in the corresponding order in the card magazine. It is again necessary to provide the system with exact information regarding the order of the different card types in advance to allow proper driving of the individual components, for example of the different readers in the card channel. This approach is also very inflexible.

The case in which different numbers of cards have to be provided for different carriers is also very difficult to handle in such known approaches, because the corresponding cards have to be arranged in the corresponding order in the card magazine, just as in the case described above, and, in addition to the job definition, each single job has to be defined exactly to allow the corresponding driving of the card reading elements in the card channel.

In cases in which it is possible that the card feeder feeds a plurality of, i.e. more than two, cards in parallel, the corresponding information for each carrier also has to be provided in the job definition so that the system can manage the corresponding activation/deactivation of the card reader in the card channel.

In summary, the disadvantage of the known prior art approaches is that they always use card feeders which are only suitable for providing cards to the handling system, but do not provide any flexibility in connection with the provision of different cards for the overall system, because the required job definition, and particularly the information regarding the card type, always have to be provided to the overall system in advance to ensure proper operation.

SUMMARY OF THE INVENTION

It is the object of the present invention to provide an improved card feeder allowing increased flexibility of the overall system.

In accordance with the first aspect, the present invention provides a method for providing cards for processing, wherein the cards are arranged in a plurality of card magazines and may be drawn from the plurality of card magazines, wherein information regarding the card type is associated with the cards, the method having the steps of (a) receiving information specifying the card type of the card to be drawn; (b) drawing a card from at least one card magazine; and (c) outputting the card for subsequent processing together with the information regarding the card type associated with the card to allow control of the subsequent processing based on the forwarded information; wherein cards of a known card type are arranged in a card magazine, and the information regarding the card type is associated with the card magazine, wherein the information associated with the card magazine is forwarded in step (c) when drawing a card from a card magazine in step (b); and wherein, in subsequent processing, the card is connected to a carrier provided to the subsequent processing and carrying information indicating the card type of the card to be connected to the carrier, wherein the method further includes the step of reading the information from the carrier.

In accordance with a second aspect, the present invention provides a method for providing cards for processing, wherein the cards are arranged in a plurality of card magazines and may be drawn from the plurality of card magazines, wherein information regarding the card type is associated with the cards, the method having the steps of (a) drawing a card from at least one card magazine; and (b) outputting the card for subsequent processing together with the information regarding the card type associated with the card to allow control of the subsequent processing based on the forwarded information; wherein cards of a known card type are arranged in a card magazine, and the information regarding the card type is associated with the card magazine, wherein the information associated with the card magazine is forwarded in step (b) when drawing a card from a card magazine in step (a); and wherein cards associated with a first group and cards associated with a second group are arranged in each of the plurality of the card magazines, wherein the groups in each card magazine are separated by a separation card, wherein the steps (a) and (b) are repeated for the first group until all separation cards between the cards of the first group and the second group have been detected.

In accordance with a third aspect, the present invention provides a method for providing cards for processing, wherein the cards are arranged in a plurality of card magazines and may be drawn from the plurality of card magazines, wherein information regarding the card type is associated with the cards, the method having the steps of (a) drawing a card from at least one card magazine; (b) reading the card drawn in step (a); (c) based on the information read from the card, accessing a database; (d) outputting the card for further processing together with the information regarding the card type associated with the card to allow control of the subsequent processing based on the forwarded information; and (e) based on the information from the database, drawing and outputting further cards; wherein cards of a known card type are arranged in a card magazine, and the information regarding the card type is associated with the card magazine, wherein the information associated with the card magazine is forwarded in step (d) when drawing a card from a card magazine in step (a).

In accordance with a fourth aspect, the present invention provides a device for providing cards for processing, having a plurality of card magazines for receiving cards, wherein information regarding the card type is associated with the cards; a drawing unit for drawing a card from at least one card magazine; an output for outputting the card together with the information regarding the card type associated with the card; and a data input for receiving information specifying the card type of the cards to be drawn; wherein cards of a known card type are arranged in a card magazine and the information regarding the card type is associated with the card magazine, wherein the information associated with the card magazine is applied to the output when drawing a card from a card magazine; and wherein the information receivable at the data input further includes a number of the cards to be provided.

In accordance with a fifth aspect, the present invention provides a device for providing cards for processing, having a plurality of card magazines for receiving cards, wherein information regarding the card type is associated with the cards; a drawing unit for drawing a card from at least one card magazine; and an output for outputting the card together with the information regarding the card type associated with the card; wherein cards of a known card type are arranged in a card magazine and the information regarding the card type are associated with the card magazine, wherein the information associated with the card magazine is applied to the output when drawing a card from a card magazine; wherein cards associated with a first group and cards associated with a second group are arranged in each of the plurality of the card magazines, wherein the groups in each card magazine are separated by a separation card, wherein a separation card detector is provided, and wherein the drawing unit and the output are configured to draw and output the cards of the first group until all separation cards between the cards of the first group and the second group have been detected by the separation card detector.

In accordance with a sixth aspect, the present invention provides a device for providing cards for processing, having a plurality of card magazines for receiving cards, wherein information regarding the card type is associated with the cards; a drawing unit for drawing a card from at least one card magazine; an output for outputting the card together with the information regarding the card type associated with the card; a reader for reading a drawn card; and a processor configured to access a database based on the information read from the card and to drive the drawing unit and the output for drawing and outputting further cards based on the information from the database; wherein cards of a known card type are arranged in a card magazine and the information regarding the card type is associated with the card magazine, wherein the information associated with the card magazine is applied to the output when drawing a card from a card magazine.

The present invention provides a method for providing cards for processing, wherein the cards are arranged in a plurality of card magazines and may be drawn from the plurality of card magazines, wherein information regarding the card type is associated with the cards, the method comprising:

a) drawing a card from at least one card magazine; and
b) outputting the card for subsequent processing together with the information regarding the card type associated with the card to allow control of the subsequent processing based on the forwarded information.

Preferably, cards of the same card type are arranged in a card magazine, and the information regarding the card type are associated with the card magazine. When drawing a card from a card magazine, the information associated with the card magazine are then forwarded. The information regarding the card type preferably includes information regarding the card material, the embossing of the card and/or a card storage medium.

Preferably, the information regarding the card storage medium include information regarding the presence of the storage medium and regarding the type of the storage medium. This allows a suitable activation of the card readers in subsequent processing depending on the indicated storage medium type, and the activation of further handling means (for example turners) depending on the indicated card type.

According to a preferred embodiment, the cards are sequentially drawn from the card magazines and forwarded. Alternatively, there is parallel drawing of the cards, wherein cards of a first card type are arranged in a first number of card magazines and cards of a second card type are arranged in a second number of card magazines. In step (a), a card is first drawn from at least one card magazine of the first number and, in parallel, a card is drawn from at least one card magazine of the second number.

According to a further embodiment of the present invention, information or data are received prior to step (a) which specify the card type of the card to be drawn, wherein these are preferably obtained by a later card carrier. In this context, it is provided that, in subsequent processing, the card is connected to a carrier which is provided to the subsequent processing and carries information indicating the card type of the card to be connected to the carrier, wherein, according to the invention, the information is read from the carrier prior to drawing the card to detect which of the cards from the plurality of card magazines is to be drawn. This information preferably further includes a number of cards to be provided.

According to yet another embodiment of the present invention, first a card is drawn and information are read from this card prior to step (b). Based on the thus read information and/or data, a database is accessed issuing further information based on which drawing and forwarding of further parts is performed. Preferably, the information obtained from the database are also used to generate a carrier, wherein the card and the further cards are subsequently connected to the carrier.

According to another embodiment of the present invention, cards of a first group and cards of a second group may be arranged in each of the plurality of card magazines, wherein these groups are separated only by a separating card in each of the card magazines. The cards of the first group are drawn from the magazines and forwarded until all separating cards have been detected in all magazines.

The present invention further provides a device for providing cards for processing, having a plurality of card magazines for receiving cards, wherein information regarding the card type is associated with the cards;

drawing means for drawing a card from at least one card magazine;

an output for outputting the card together with the information regarding the card type associated with the card.

According to the invention, there is thus provided a card feeder which draws cards, preferably from up to four card magazines, in sequential, parallel or selective order and supplies them to a tunnel transport associated with the card channel. Preferably, each card magazine includes only one card type, but the different magazines may accommodate different card types.

Preferably, the card is a plastic card, such as they are used today for example for credit cards or the like. However, the present invention is not limited to such plastic cards. In fact, any card may be handled, wherein "card" in the sense of the present invention does not only mean plastic card, but also includes other cards or card-like elements. Further, the term "card" in the sense of the present invention also includes data carriers, such as mini disks or mini CDs, SIM cards, etc. For example, the cards are credit cards, health insurance cards, driving licenses and identity cards, customer cards, etc.

Preferred embodiments of the present invention are defined in the dependent claims.

BRIEF DESCRIPTION OF THE DRAWINGS

In the following, preferred embodiments of the present invention will be described in more detail with respect to the accompanying drawings, in which:

FIG. 4 shows flow charts describing the parallel drawing of cards from a plurality of magazines, wherein FIG. 4A describes the parallel drawing without toggle and FIG. 4B describes the parallel drawing with toggle;

FIG. 6 is a first preferred embodiment of the present invention for offline operation, wherein

FIG. 7 is a second preferred embodiment of the present invention for the online operation, wherein FIG. 7A shows a flow chart according to a first implementation of the online operation.

FIG. 8 is a third preferred embodiment of the present invention for the reliable processing of small jobs, wherein

DESCRIPTION OF THE PREFERRED EMBODIMENTS

In the following description of preferred embodiments, elements having like or similar effects are provided with the same or similar reference numbers in the individual drawings. Further it is to be noted at this point that, in the following description, the term "plurality" is used meaning that at least two or more of the given elements are provided.

As mentioned above, the present invention relates to a method and a device for providing cards for processing, such as credit cards or the like. However, the present invention is not limited to cards or plastic cards, but any cards may be handled, wherein "card" has the above meaning with respect to the present invention.

Preferably, the present invention is employed on cards, such as embossed CR-80 cards, unembossed CR-80 cards, or generally plastic cards with a thickness between 0.3 to 1.5 mm.

Figure 1:
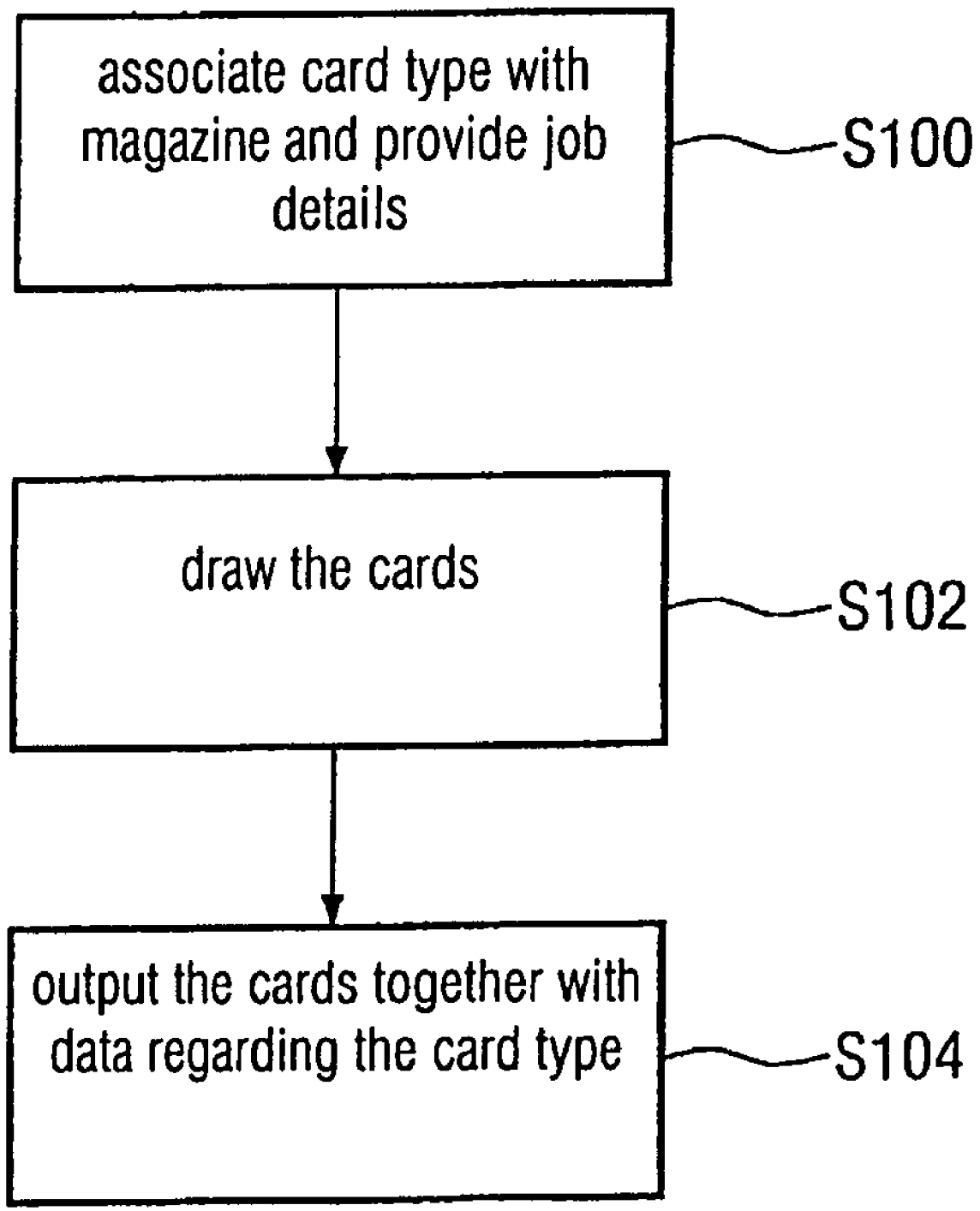
FIG. 1 is a flow chart of the inventive method according to an embodiment.

According to the present invention, as indicated in FIG. 1, in a first step S100 or a preparation step, a so-called job definition is provided to the overall system, wherein at least the card types contained in the various magazines are specified so that there is a corresponding association of the card type with a corresponding magazine. The card type includes information regarding the card material, for example whether it is a thick plastic card or a thin plastic card, whether embossing is provided or not, and what kind of storage medium is provided (chip card, contactless chip card, magnetic stripe, JIS2, OCR-readable information, etc.).

As soon as this information is provided to the card feeder, the inventive method starts by drawing one card or several cards from the magazines in step S102, and providing them to other portions of the system for subsequent processing in step S104, wherein the respective data about the card type concerning the card are forwarded together with the card.

Figure 2:
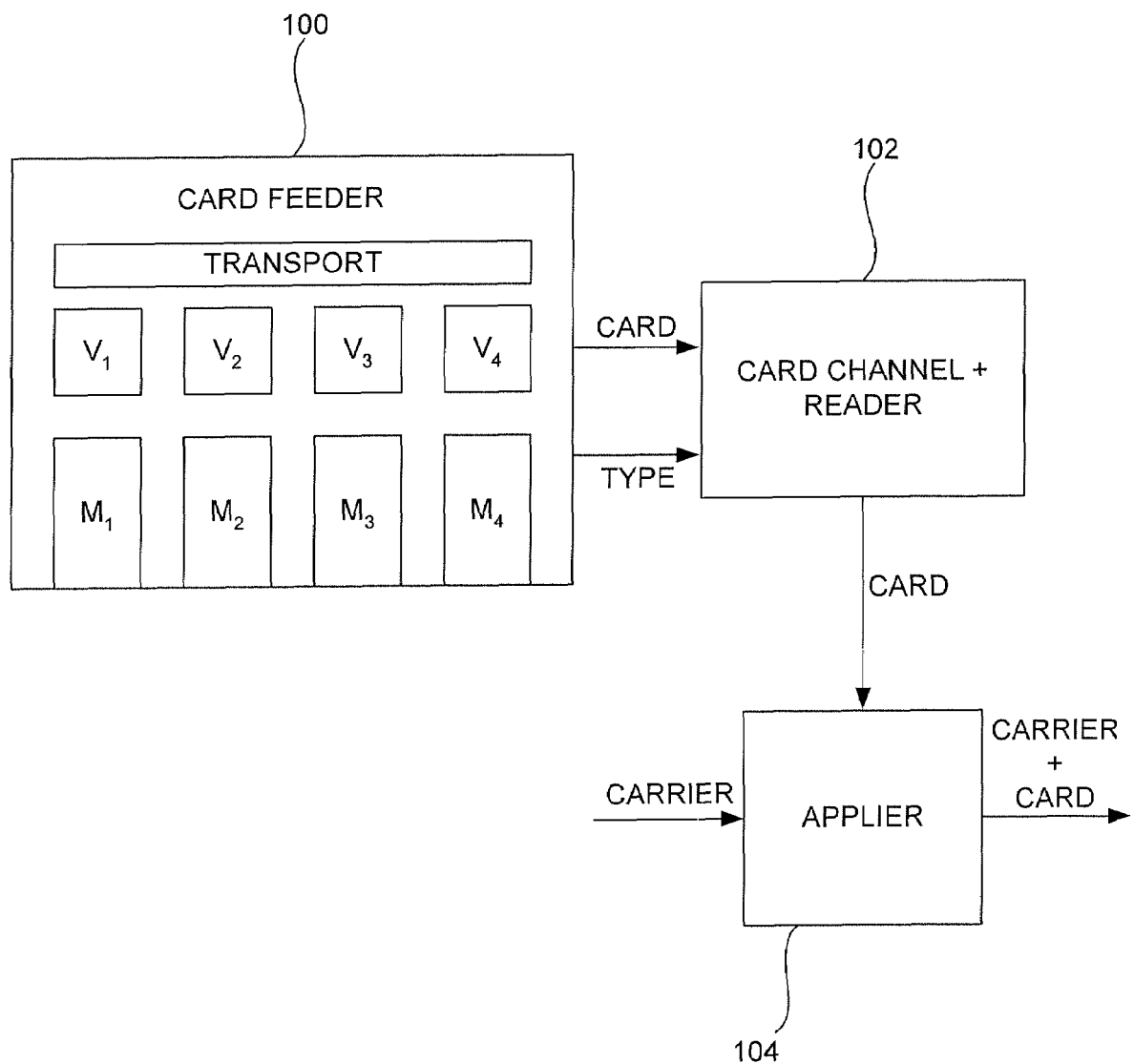
FIG. 2 is a block diagram of the inventive device according to an embodiment in a card system.

FIG. 2 shows a block diagram showing the inventive card feeder 100 in an overall system for applying cards and carriers. The card feeder 100 is operatively connected to a card channel 102 which, in turn, is operatively connected to an applier 104. The card feeder 100 includes a plurality of card magazines $M_1$ to $M_4$, in the illustrated embodiment there are four card magazines, wherein, however, any number of card magazines may be provided as long as at least two card magazines are arranged. As indicated by the arrows between the card feeder 100 and the card channel 102, a card is transferred from the card feeder 100 to the card channel, together with information regarding the card type. This information regarding the card type forwarded from the card feeder to the card channel 102 allow the card channel 102 to configure itself to activate/deactivate the readers arranged in the card channel correspondingly. Then, depending on the card type, for example a chip card reader and a magnetic card reader are activated, if the next card to be processed in the card channel comprises both a card chip and a magnetic stripe. An OCR reader for detecting text or a bar code, which might be provided, would be deactivated in this case. If the card is a card without storage media, this would be indicated by the corresponding type information, and the card channel 102 would configure itself correspondingly, i.e. deactivate all readers. This deactivation of the readers not used is necessary to avoid interruption of the operational process, because in the case that no signal is detected at a reading station which is active, an error in the card supply is assumed and the system is stopped for eliminating the presumably present error. In order to avoid this in the flexible drawing of cards from the card magazines $M_1$ to $M_4$ according to the invention, card type information are sent to the card channel together with the respective card so that it may perform the corresponding activation/deactivation.

The advantage of this approach is evident, because it is no longer necessary to lay down all possible orders of the various consecutive work passes for large jobs in advance, but only to specify which cards from which magazines are to be connected to a carrier, irrespective of what type of card is contained. The required information for driving the card channel are transferred from the card feeder to the card channel together with the respective card. The advantage of this approach is that now increased flexibility in providing the cards for the application to a card carrier may be achieved in a simple way, because the individual cards now only have to be loaded into the magazines and the corresponding information regarding the card type contained in each of the magazines has to be provided to the overall system. Then, depending on the circumstances, the desired number of cards is drawn based on the overall control of the jobs, a changing number of cards is also readily possible, and the required driving of the card channel and the readers arranged there is performed on the basis of the card type information transferred with each card.

As is further to be seen in FIG. 2, the card processed by the card channel 102 is output to the applier 104, in which it is connected to a carrier provided to the applier 104, wherein it is also possible to connect a plurality, i.e. two or more cards, to the carrier. The applier then outputs the carrier with the cards arranged thereon. Preferably, there is a check whether card carrier and card really match prior to connecting cards and card carrier, which is, for example, managed by reading the card and reading data from the card carrier and matching this information. For examples of such procedures see the German patent applications of the applicant given above in the introduction.

Reading the individual cards in the card channel 102 serves, as mentioned, for checking whether the cards and the card carrier to be connected really match. Furthermore, the reading in the card channel 102 serves for ensuring that the present card really is the one corresponding to the order of processing as provided externally.

Preferably, the card feeder 100 includes up to four card magazines $M_1$ to $M_4$, wherein the filling amount per magazine depends on the card thickness and a possible card embossing. Each magazine may, for example, receive up to 500 unembossed cards with a thickness of 0.8 mm. In the magazines, the cards may lie face up or face down, wherein the setting does not have to be identical for all magazines per job. If the receptacle of the respective magazine is in the initial position, a magazine may be inserted and the card stack is, for example, moved up by a spindle which is driven via a stepper motor. When the uppermost card reaches a defined initial position, the magazine is operable. Preferably, a magazine situated in the initial position just described cannot be removed.

The card feeder 100 includes a number of vacuum suction means corresponding to the number of card magazines, which, when the system is operable, serve for drawing the uppermost card from the card magazine and transfer it to a tunnel transport. Preferably, a retaining device is provided which is arranged above the magazine to ensure separation of the individual cards.

According to a preferred embodiment, the card feeder 100 includes a sensor, preferably a capacitive sensor, for interrogating whether a drawn card has reached its target position in the tunnel transport. If there is a confirmation that the card has reached its target position, the tunnel transport is clocked once, i.e. advanced by a predetermined distance. If the interrogation has a negative result, an error is indicated.

According to a preferred embodiment of the present invention, the card feeder 100 may have three different modes of operation explained in more detail in the following.

In the first mode of operation, referred to as job definition, the drawing type and the card type per magazine is fixedly deposited in a job file provided to the card handling system.

In a second mode of operation, the offline mode of operation (fetching via the card carrier), the desired cards in type and number are selectively fetched per card carrier from the magazines via coded information on a card carrier.

In the third mode of operation, the online operation (fetching via a card), a card type/a magazine is defined as a so-called leading card. After one of the leading cards has been drawn and the coded information has been read out, the associated cards of this group are drawn. The corresponding information is determined from a customer database, for example by means of an identification reference number.

For the above-described modes of operation, the following parameters are provided to the card handling system for each stop as part of the job file. The parameters include the mode of operation, the sequence of the magazines, the magazine location, the supply order and the card type. When defining the mode of operation, the first specification is whether the cards are drawn from the magazines sequentially, in parallel with toggle operation, or in parallel without toggle operation. For the mode of operation "job definition", these three specifications are sufficient. For the other two modes of operation offline and online, offline operation or online operation is correspondingly specified in the mode of operation.

The sequence of the magazines is selected from a provided table which will be further discussed below.

The supply order specifies whether the cards are supplied face up or face down. The card type specifies the information regarding card material, card embossing, card storage medium.

Based on FIG. 3, the sequential drawing will be described in more detail in the following, wherein, in step S300, a card is drawn from a magazine $M_n$. n denotes one of the provided magazines, wherein, for example, n=1, 2, 3 or 4. In step S302, the drawn card is output, for example, to the card channel 102 (see FIG. 2) together with the card type information. Next, in step S304, there is a change to the next magazine by increasing the index n by 1. Before another card is drawn, there is a check, in step S306, whether n corresponds to the maximum number of existing magazines (for example n=4; $M_{max}$=4). If not, the method proceeds to step S300, and the next card is drawn from a subsequent magazine. If, in step S306, there is a determination that the card was drawn from the last magazine, n is reset to 1 in step S306, i.e. starting again with drawing from the first magazine, and the method returns to step S300.

Figure 3:
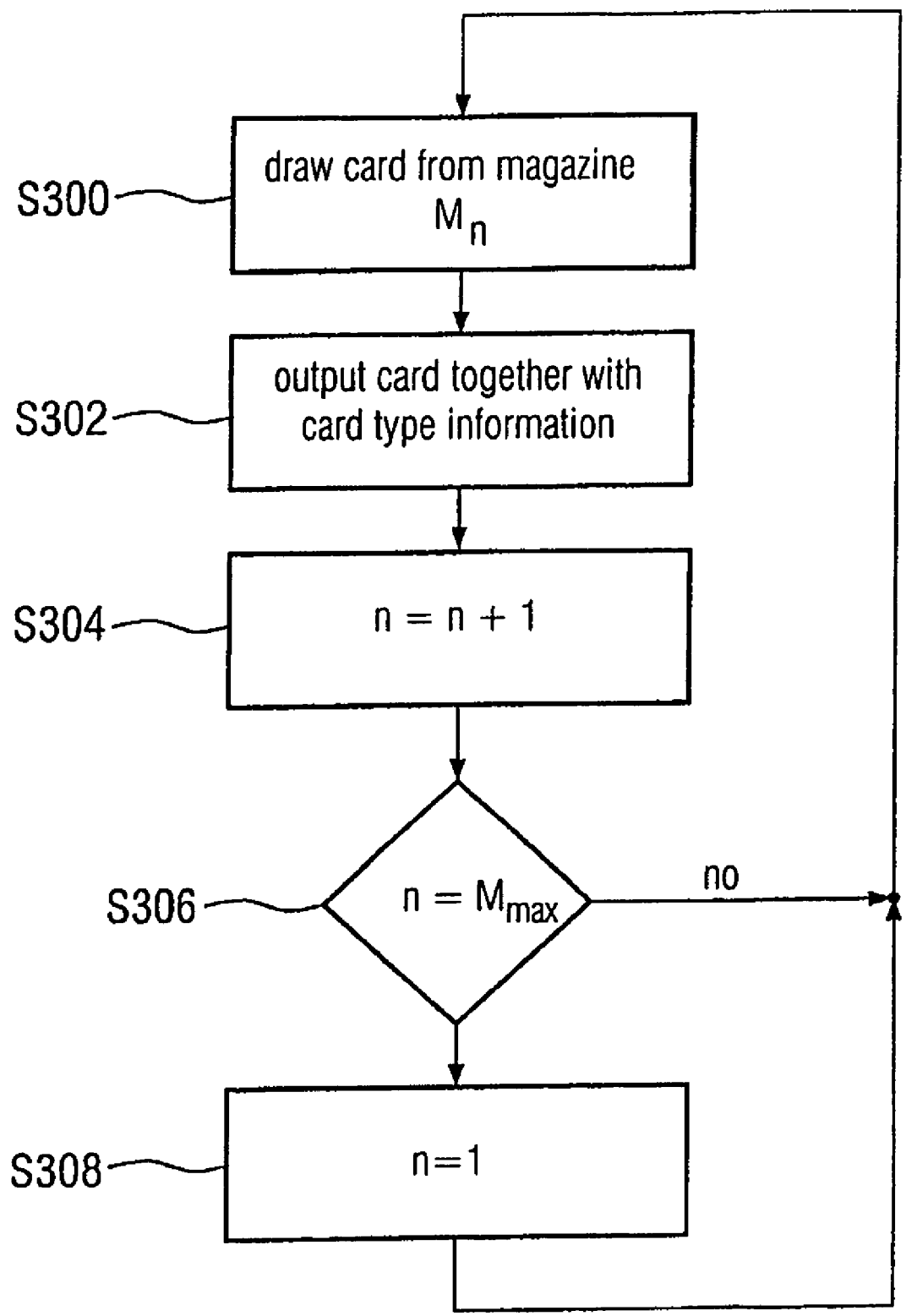
FIG. 3 is a flow chart describing the sequential drawing of cards from a plurality of magazines.

In the way described with respect to FIG. 3, various sequential drawing orders may be achieved, for example:

$M_1(m) \to M_2(n) \to M_3(o) \to M_4(p) \to M_1(m) \to M_2(n) \to M_3(o) \to M_4(p) \ldots$ $M_1(m) \to M_2(n) \to M_3(o) \to M_1(m) \to M_2(n) \to M_3(o) \to M_1(m) \to M_2(n) \ldots$ $M_2(n) \to M_3(o) \to M_4(p) \to M_2(n) \to M_3(o) \to M_4(p) \to M_2(n) \to M_3(o) \ldots$ $M_1(m) \to M_3(o) \to M_4(p) \to M_1(m) \to M_3(o) \to M_4(p) \to M_1(m) \to M_3(o) \ldots$ $M_1(m) \to M_4(p) \to M_1(m) \to M_4(p) \to M_1(m) \to M_4(p) \to M_1(m) \to M_4(p) \ldots$ In the above list, m, n, o and p indicate the number of cards drawn from the associated magazine, before cards are drawn from another magazine, wherein m, n, o, p=0, 1, 2 . . .

Based on FIG. 4, the parallel drawing from a plurality of card feeder magazines will be described in more detail in the following. FIG. 4*a* shows a flow chart showing the parallel drawing without toggle operation. In step S400, the cards are drawn simultaneously from the magazines $M_n$ and $M_{n+x}$, for example from the magazines 1 and 2, wherein then n=1 and x=1. Next, the cards are output, for example, to the card feeder 102 together with the respective card type information, as indicated in step S402.

Besides the parallel drawing operation without toggle operation, there is the parallel drawing operation with toggle operation described with respect to FIG. 4B. This mode of operation is advantageous because it makes an increase in capacity possible by arranging cards of the same type in several magazines. This particularly offers the advantage that individual magazines can be refilled while the system is running—an interruption is avoided. Furthermore, this mode of operation is advantageous when a first card type is used more often than a second card type, i.e. when, for example, two cards of the first type are to be applied to a card carrier and only one card of a second card type is to be applied to the card carrier, or when in operation a second card is not to be applied to each of the carriers, but always a first card. In this case, there may be a provision that the card feeder, which, for example, includes four magazines, contains cards of the first type in the first to third magazines, and cards of the second type only in the fourth magazine. In this mode of operation, there is a change to the second magazine if the first magazine is empty, and the cards of the first card type are drawn therefrom. Alternatively, with four magazines, two magazines may also respectively be populated with the same card types so that there is a change to the next magazine with the same card type, if one magazine is empty, which makes it possible to refill the cards without interruption during operation of the system.

FIG. 4B shows a flow chart illustrating the parallel drawing with toggle operation. In step S404, cards are drawn in parallel from the magazines, similarly to step S400, wherein it is assumed by way of example that also n=1 and x=1. Next, in step S406, the cards are output together with the associated card type information, and, in step S408, there is a check whether one of the magazines is empty. If not, the method returns to step S404. If, in step S408, it is determined that one of the magazines is empty or also that both magazines are empty, the method proceeds to step S410 where the change to a subsequent magazine is prepared by increasing the counter n by 1 or by increasing the counter x by 1, so that the above functionality of changing from a first magazine to a second magazine is implemented. Subsequently, the method returns to step S404.

The following list shows examples for the parallel drawing with toggle operation from a plurality of up to four magazines.

$M_1(m) \to M_2(n) \to M_3(o) \to M_4(p) \to M_1(m) \to M_2(n) \to M_3(o) \to M_4(p) \ldots$ $M_1(m) \to \mathbf{M_2(n)} \to M_3(o) \to M_4(p) \to \mathbf{M_1(m)} \to M_2(n) \to M_3(o) \to M_4(p) \ldots$ $M_1(m) \to M_2(n) \to M_3(o) \to M_1(m) \to M_2(n) \to M_3(o) \to M_1(m) \to M_2(n) \ldots$ In the above list, n, m, o and p indicate the number of cards drawn from the associated magazine before cards are drawn from another magazine, wherein m, n, o, p=0, 1, 2 . . .

In the above table, bold letters denote the magazines between which the change is performed. For the first case, this means that the same card types are arranged in the magazines $M_1$ and $M_2$, and different card types are arranged in the magazines $M_3$ and $M_4$. The parallel drawing is done such that first cards are drawn from the magazines $M_1$, $M_3$ and $M_4$, and, in the case that the magazine $M_1$ is empty, there is a change to magazine $M_2$.

The high flexibilization in processing various card types described above requires the inventive approach to accompany each card with its description at least regarding its card type for the activation and/or deactivation of the elements existing in subsequent processing units to thus avoid errors in the operation of the overall system, which would be caused, for example, when trying to read a magnetic stripe card without chip in the chip reader.

Figure 5:
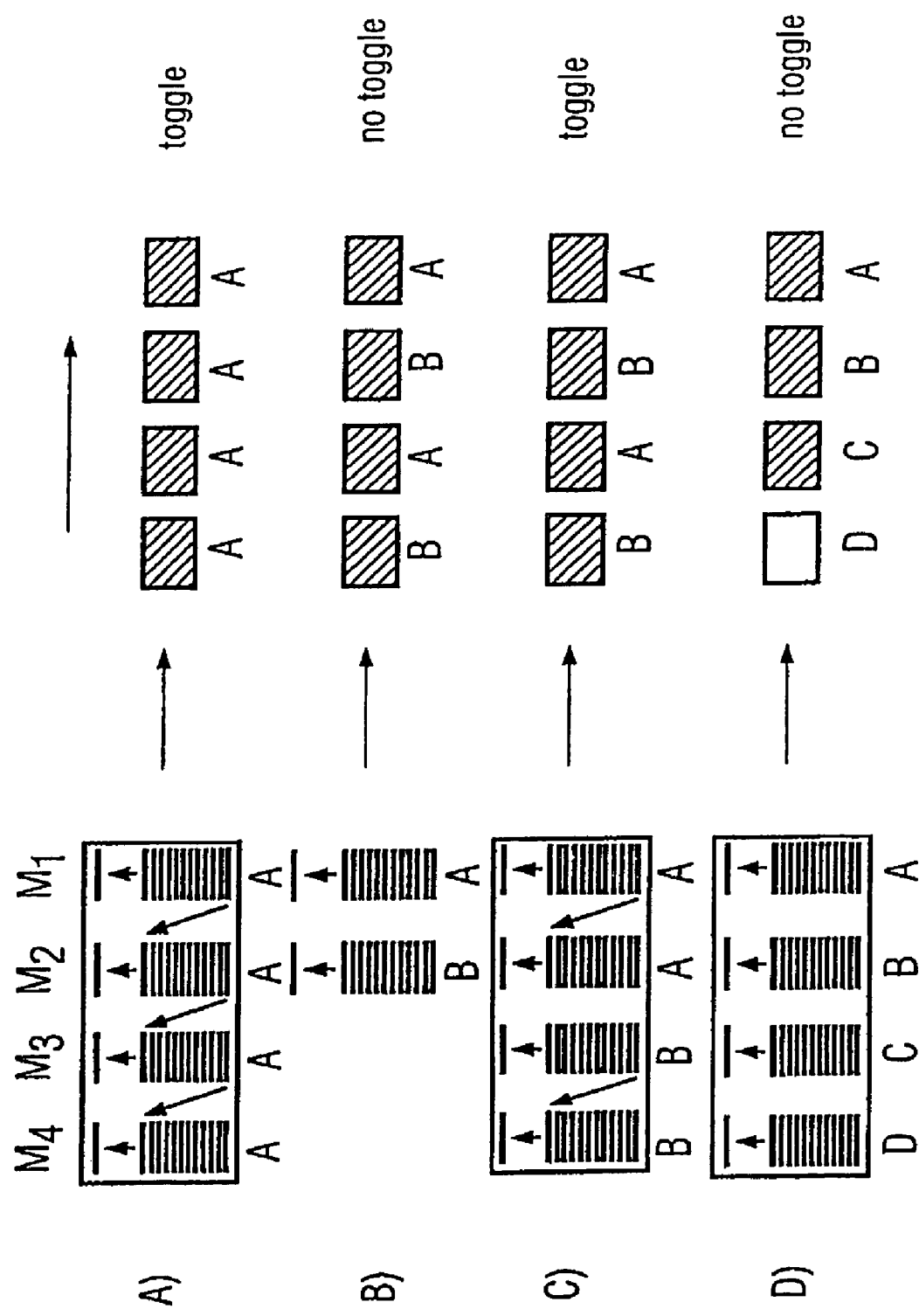
FIGS. 5A to 5D show examples for a parallel drawing with toggle.

FIG. 5 shows various examples for the parallel drawing of cards from up to four card magazines of a card feeder. FIG. 5A shows the special case that the same cards are deposited in all four magazines $M_1$ to $M_4$, wherein FIG. 5A shows the toggle operation, i.e. first only drawing cards from the magazine $M_1$, and only after the magazine $M_1$ is empty, changing to magazine $M_2$. The resulting card order or card sequence after the drawing is shown in the right-hand area of FIG. 5.

FIG. 5B shows the parallel drawing of different cards A and B from two magazines $M_1$, $M_2$. The card sequence after the drawing is again shown in the right-hand half of FIG. 5.

FIG. 5C shows the parallel drawing in toggle operation, wherein cards of type A are arranged in magazines $M_1$ and $M_2$, respectively, and cards of type B are arranged in the magazines $M_3$ and $M_4$, respectively. First, cards from the magazines $M_1$ and $M_3$ are drawn simultaneously, and, in the case that magazine $M_1$ or $M_3$, respectively, is empty, there is a change to magazine $M_2$ or $M_4$, respectively. The card sequence after the drawing is shown in the right-hand half of the figure in FIG. 5C.

FIG. 5D shows the parallel drawing of cards from the four magazines $M_1$ to $M_4$, wherein each magazine contains a different card type A to D. The resulting card sequence after the drawing is again shown in the right-hand area of FIG. 5.

According to the invention, different card data may thus be processed in one job in a simple way, wherein the information necessary for the activation of subsequent processing modules, for example the readers in the card channel, may accompany the cards via the definition of the card type.

Figure 6A:
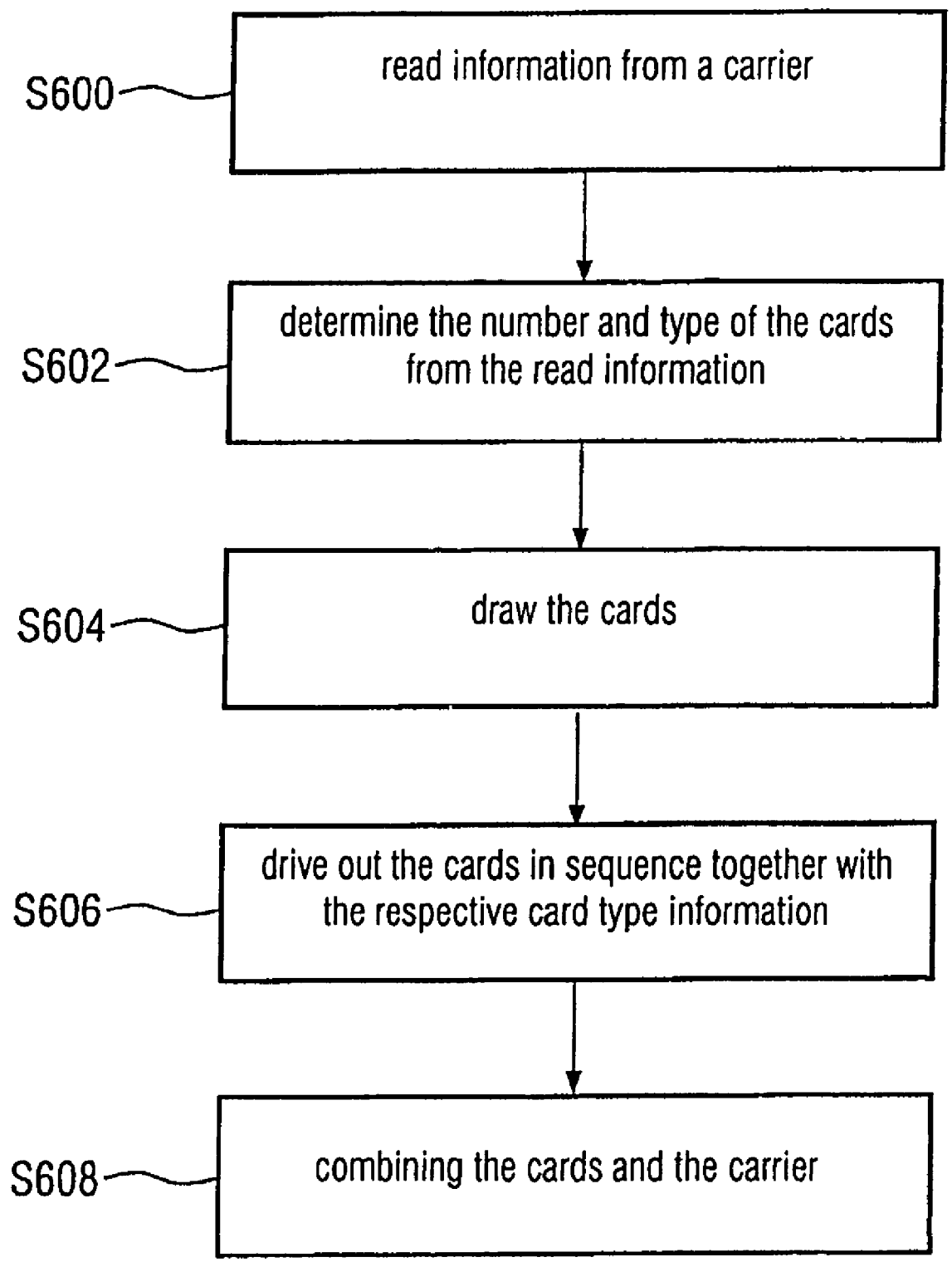
FIG. 6A shows a flow chart according to a first implementation of the offline operation.

Based on FIG. 6, a first preferred embodiment of the present invention will be described in the following, namely the so-called offline operation of the inventive card feeder. FIG. 6A shows a flow diagram of the offline operation according to a first implementation. In step S600, information is read from a carrier supplied to the handling system, for example a carrier identification, which contains information on the card type and the number of cards to be connected to the corresponding carrier. In step S602, the number and the type of cards to be applied is determined based on this read information, and, in step S604, the cards are drawn either sequentially or in parallel, as described above, and, in step S606, they are provided to the card channel together with the associated card type information. Finally, in step S608, the applying and/or combining and connecting of the cards and the carrier is performed. This implementation is also referred to as offline operation with leading carrier.

Figure 6B:
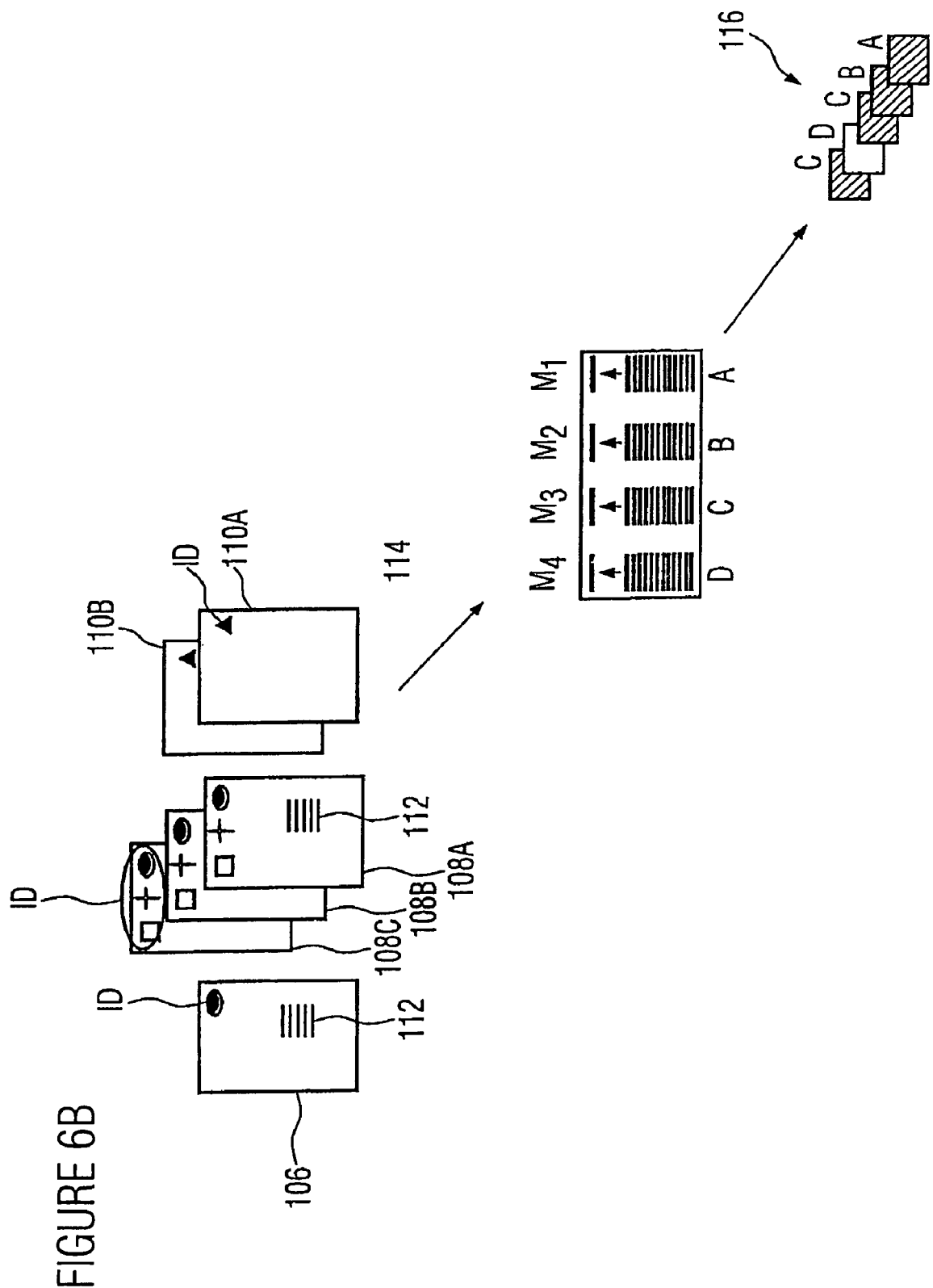
FIG. 6B shows a schematic flow diagram.

FIG. 6B shows a schematic flow diagram showing a plurality of card carriers 106, wherein a plurality of card carriers 106, 108a-108c, and 110a and 110b are provided. The card carriers 106-110 respectively include identification markers ID, wherein the carriers 106 and 108 are already personalized, as indicated by the reference number 112 denoting an address field or the like. The identification information ID is read from a carrier and transferred to the card feeder, as schematically illustrated by arrow 114. Depending on the read information, the magazines $M_1$ to $M_4$ are driven to draw cards from the magazines so that the result is the card sequence shown at 116 in FIG. 6B. As can be seen, the sequence of the cards may be controlled flexibly by the various identification markers ID so that, for example, the cards A-D and subsequently again the card C are provided.

In order to compensate for differences in the processing between carrier and card, either a card buffer or a sheet buffer may be provided in this application to ensure that the required cards and carriers arrive at the applier at the same time.

Figure 6C:
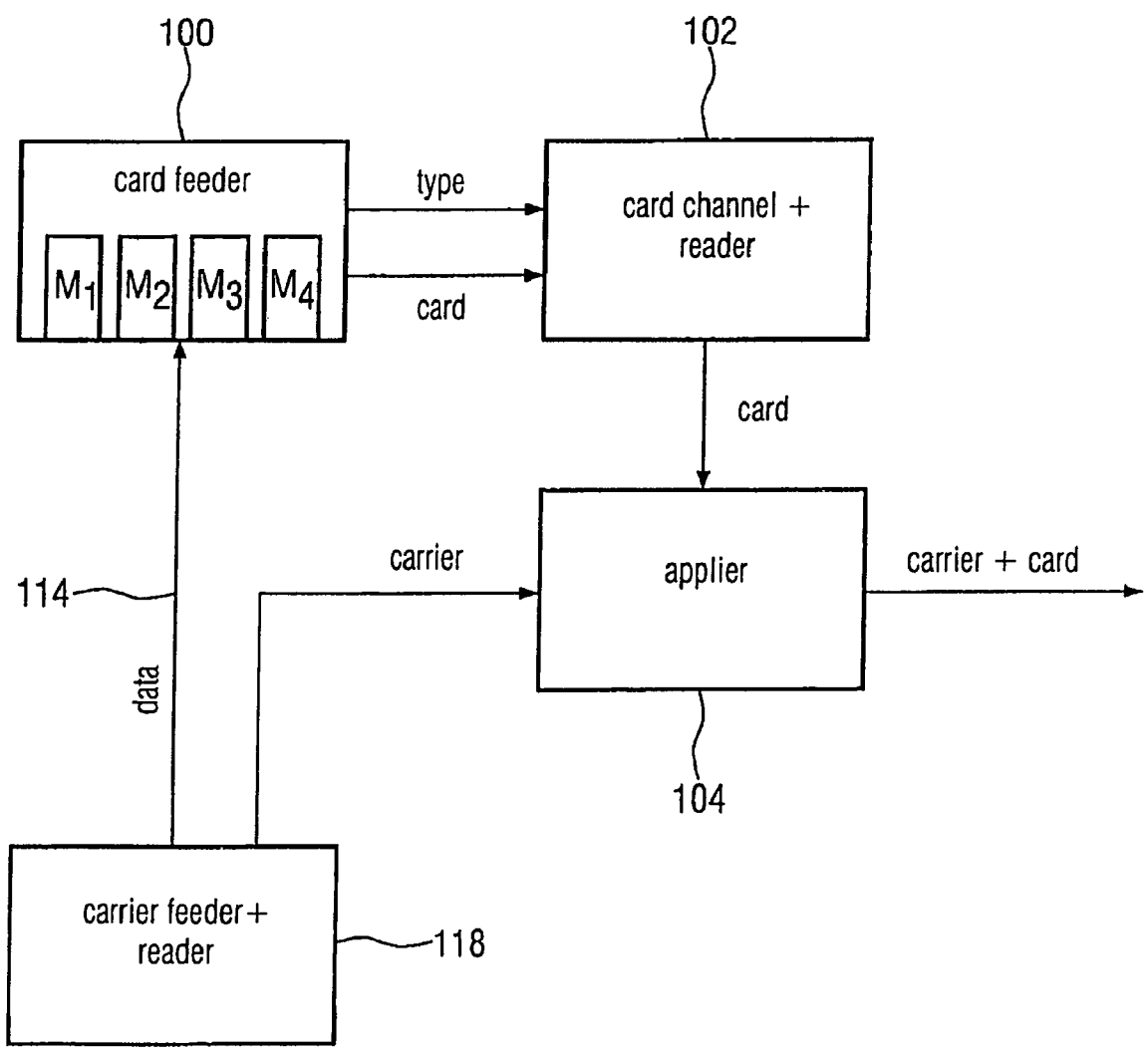
FIG. 6C shows a block diagram of the device in a card system.

FIG. 6C shows a block diagram of the system according to this embodiment based on the block diagram described with respect to FIG. 2 and extended correspondingly. The system further includes means 118 providing the personalized carriers, for example a carrier feeder or the output of a cutting machine. This feeder 118 further includes a reader to read the identification marker ID on the carriers and provide the corresponding data via the data line 114 in the card feeder. The card feeder 100 then draws the cards in the manner described above and transfers them to the card channel together with the type information, from where they are supplied to the applier in the manner described above and are connected to the provided carrier there, so that the carrier with card/cards arranged thereon is output at the output of the applier.

Figure 6D:
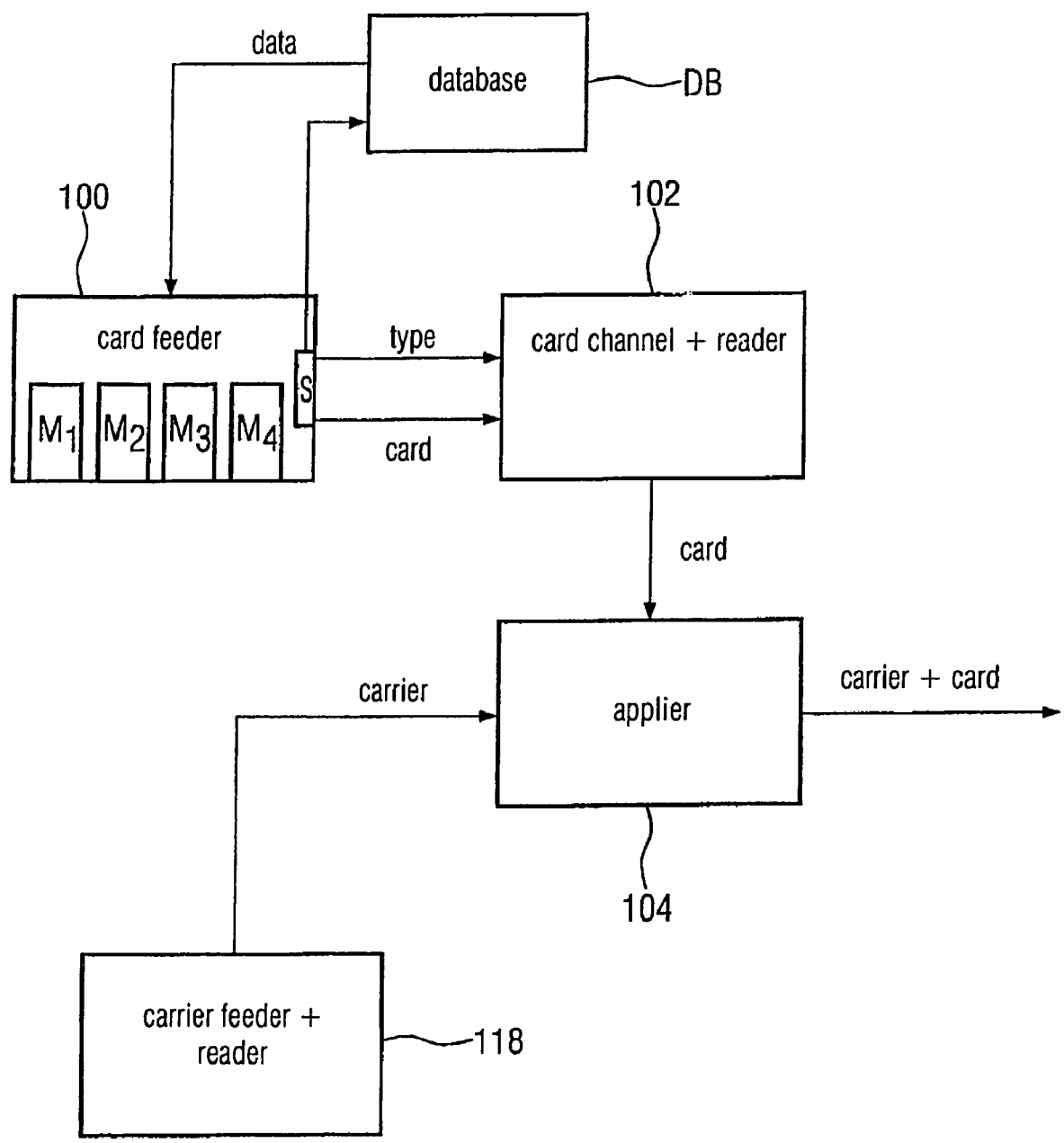
FIG. 6D shows a block diagram according to a second implementation of the offline operation.

FIG. 6D shows a block diagram of the offline operation according to a second implementation referred to as offline operation with leading card. A card defined as "leading card", for example by selection of the magazine $M_1$, is drawn and read by means of a sensor S. Based on the read data or information, a database DB is accessed to draw further cards for the job based on the card information obtained from the database DB. The leading card and the further cards are then provided to the card channel together with the respective card type information. In parallel to and independent of the provision of the cards, the card carrier is provided via the means 118 described above. The identification marker of the carrier is read via the reader to identify the carrier. As described, the provided cards and the carrier are then combined and connected in the applier, wherein the match of card and/or cards and carrier is checked in the applier.

With respect to FIG. 7, yet another preferred embodiment of the present invention will be explained in the following, namely the online operation. FIG. 7A shows a flow chart of the online operation according to a first implementation. It is necessary to define a card type as "leading card". This definition is, for example, done by selection of the first magazine $M_1$. According to this mode of operation, as shown in FIG. 7A in step S700, the leading card of the job is first drawn from the corresponding magazine, for example $M_1$. In step S702, there is now a reading of the leading card and, based on the read data or information, a database is accessed in step S704, wherein card and carrier data are read out from the database in step S706. In step S708, further cards are drawn based on the card information, and, in step S710, the leading card and the further cards are output together with the respective card type information. Further, in step S712, a card carrier is generated based on the carrier information obtained from the database, and, in step 714, carrier and cards are combined.

Figure 7B:
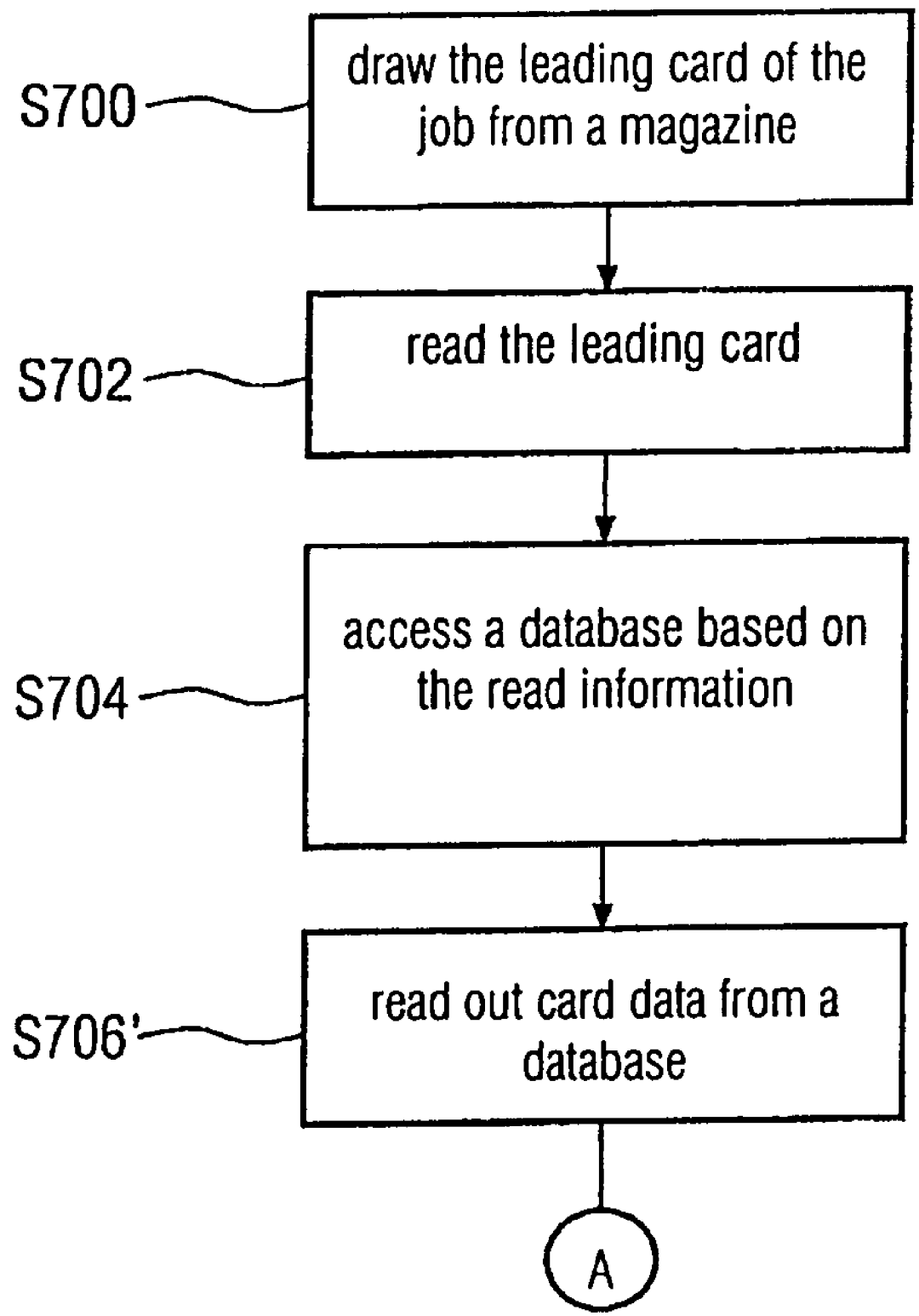
FIGS. 7B and 7C show a flow chart according to a second implementation of the online operation.
Figure 7C:
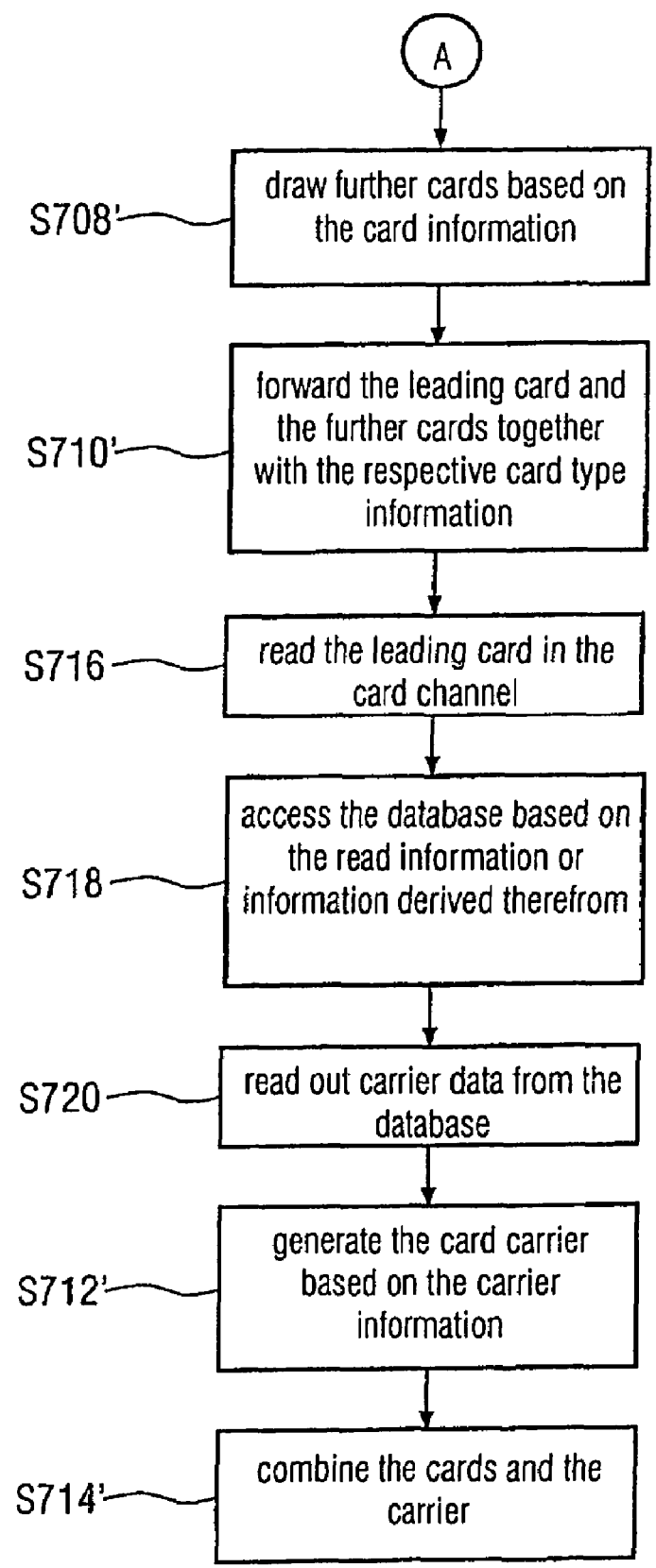

FIGS. 7B and 7C show a flow chart of the online operation according to a second implementation. This implementation does not differ from the embodiment described with respect to FIG. 7A in the steps S700 to S704. Unlike the above embodiment, however, only card data or card information is read in step S706'. Subsequently, the further cards, if any, are drawn in step S708' and output together with the leading card in S710' (similarly to FIG. 7A). Unlike FIG. 7A, however, there is no generation of the carrier. Instead, the leading card is read again, for example in the card channel, in step S716, the database is accessed again based on the read information in step S718, and, in step S720, the carrier data are read out from the database. In step S712', the carrier is then generated based on the data obtained in step S720. In step S714', cards and carrier are connected.

This implementation is chosen when additional backing up of the first reading in the card feeder is desired. This approach is not necessarily required in a bar code reading, a chip reading or a magnetic stripe reading in the card feeder, because in this reading the data are obtained with high certainty. However, the second implementation may also be used for such cards.

Figure 7D:
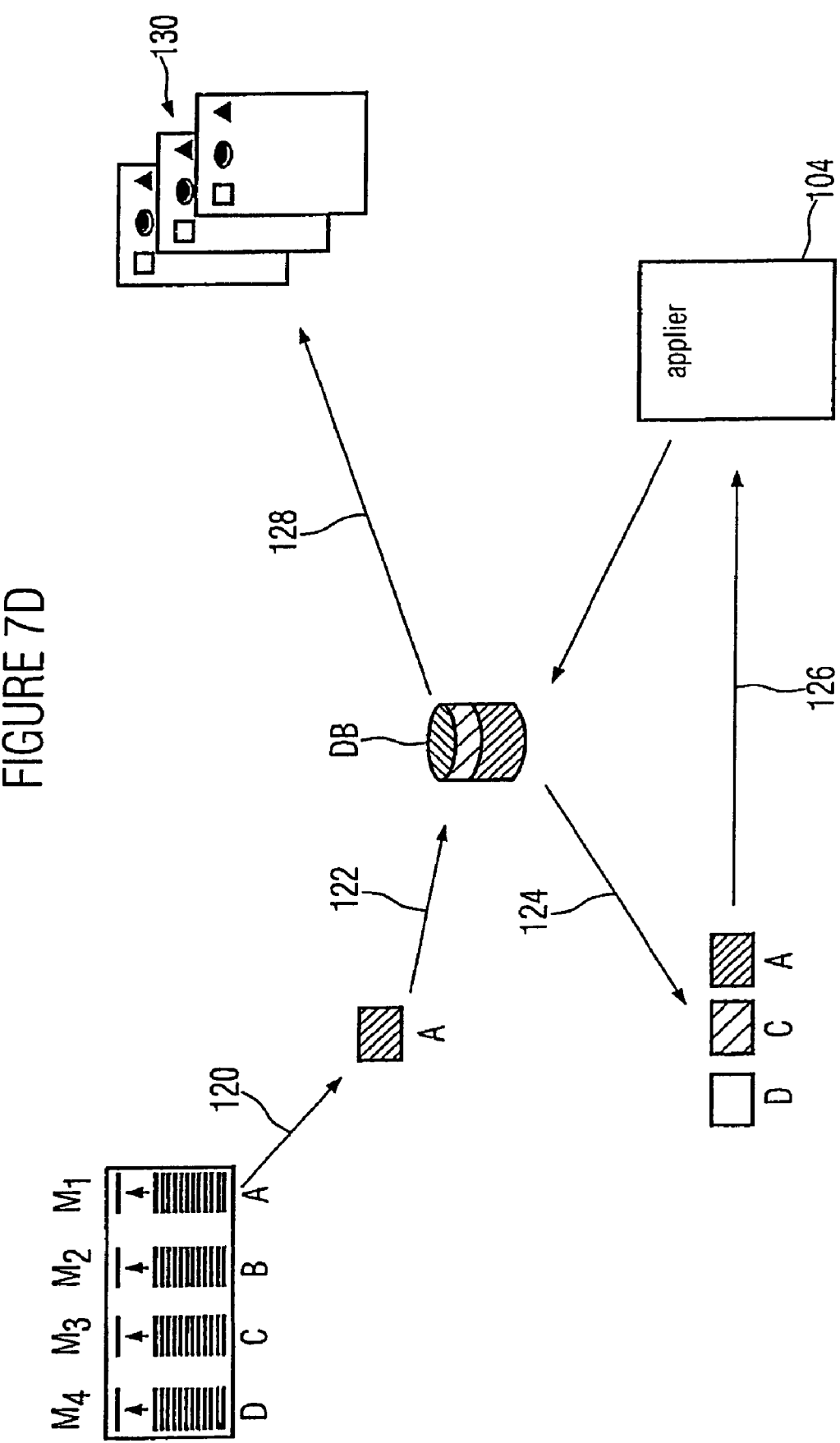
FIG. 7D shows a schematic flow chart.

FIG. 7D shows the above-described flow schematically, wherein the leading card A is first drawn from the magazine, as indicated by arrow 120. This card is then read directly after drawing, as illustrated by arrow 122. Based on the data obtained from the database DB, as illustrated by arrow 124, the further cards CD are drawn from the magazines and provided to the applier 104 together with the card A, as illustrated by arrow 126. Further, as illustrated by arrow 128, the carriers 130 are generated based on the information from the database, for example by printing the personalized card carriers. The selected data and the personalized card carriers generated online are then combined in the applier.

Figure 7E:
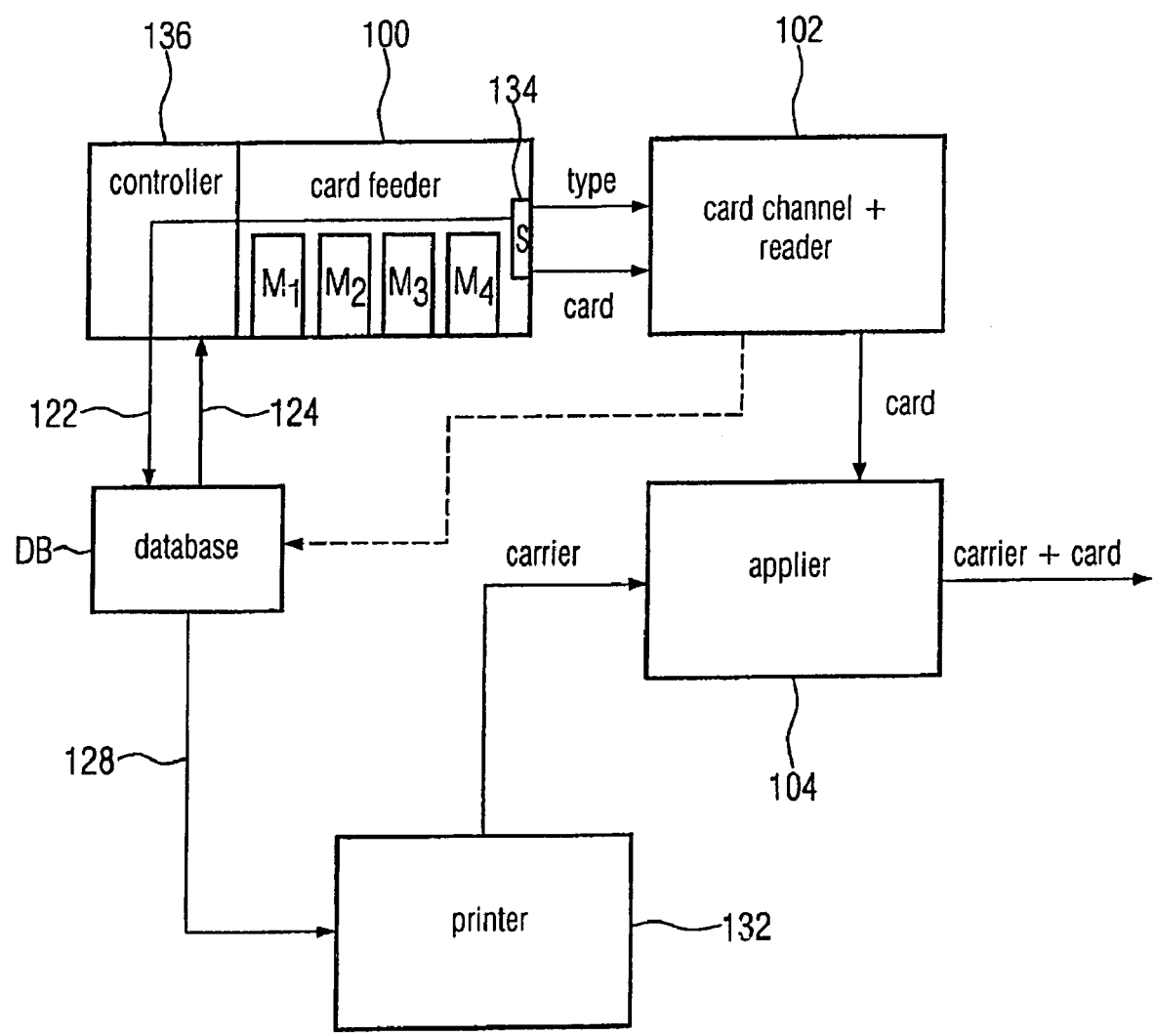
FIG. 7E shows a block diagram of the device in a card system.

FIG. 7E shows the block diagram of FIG. 2 in extended form. As can be seen, the system for a realization of the process described in FIG. 7A further includes the database DB and a printer 132. The card feeder 100 is further provided with a sensor 134, preferably at the output of the feeder 100, and further includes a controller 136. In the online operation described above, the card drawn from the magazine $M_1$ is read, as mentioned, by means of the sensor 134 to obtain an identification marker, for example an identification number or the like. By means of this identification number, the database DB is accessed via the controller 136 and the line 122 to obtain the information necessary for this job regarding card number and carrier. The information regarding card number and card types are returned to the controller 136 of the card feeder 100 via the line 124 to thus perform a corresponding driving of the card feeder for drawing the further desired cards. Furthermore, the carrier data are provided to the printer 132 via the line 128 to generate the personalized card carrier, which is then later provided in the applier 104 together with the required cards to obtain a card carrier with cards applied thereon in a conventional manner.

Furthermore, FIG. 7E shows the implementation of the embodiment described with respect to FIGS. 7B and 7C. Through the line (broken line) between the card channel 102 and the database DB, the data read from the leading card are forwarded to the database for an access to the same.

At the beginning of the processing of the job, as mentioned, a card is drawn from the first magazine $M_1$ and transferred to an intermediate transport via the tunnel transport. There, for example, the reading, for example a contactless chip reading, may be provided. After identifying the cards, there is a read-out from a customer database by means of an identification reference number which other cards belong to this group, and these are drawn. When the next free tunnel position reaches the first magazine, the just described process is repeated.

With respect to FIG. 8, a third preferred embodiment of the present invention will be described in the following, namely the so-called job separation with separation cards. This mode of operation allows a safe and efficient processing of small jobs. In this case, the cards and/or the card types for each job are stored in the magazines and separated by separation cards for each job. These separation cards have, for example, conductor loops which are detectable inductively. When a card is drawn in from a magazine into the tunnel transport, there is a check whether a separation card has been detected or not. This check is preferably done by an inductive sensor. If the card feeder detects the separation card, no more cards are drawn from the corresponding magazine, and the separation cards are preferably transported to the card channel and driven out there. When all separation cards for the card types defined in a job have been detected, the command "drive card channel empty" is issued so that the cards still in the card channel are processed in a conventional way, but that the card channel is ensured to be empty prior to processing the subsequent job. Preferably, the remaining elements of the card handling system, i.e. the applier and all downstream elements, are also driven empty so that no elements associated with the previous job are still in the handling system before the beginning of the next job.

Figure 8A:
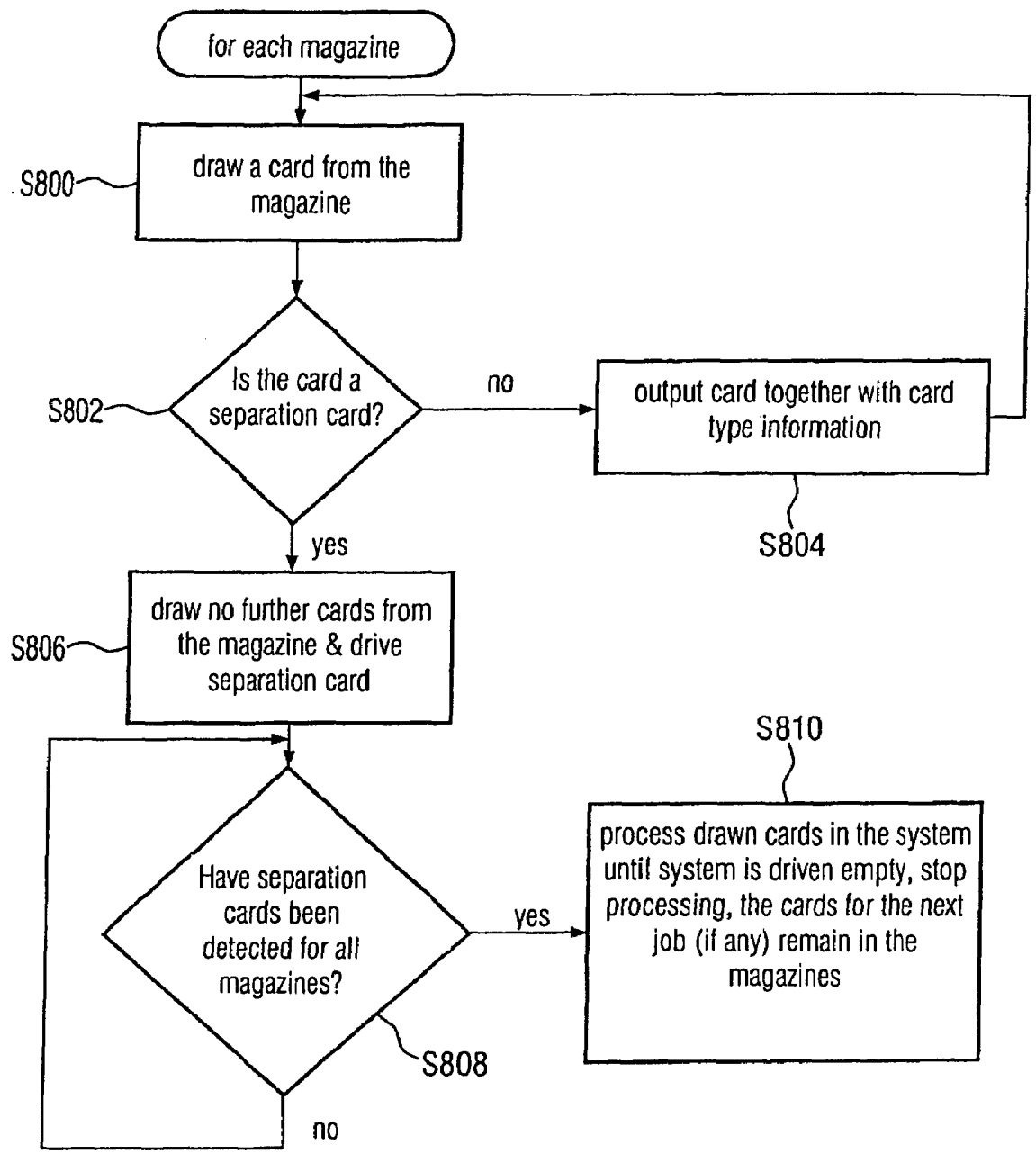
FIG. 8A shows a flow chart and FIG. 8B shows a schematic representation of the card magazines.

FIG. 8A shows a flow chart explaining the flow of this mode of operation in more detail. In step S800, as usual, a card is drawn from a magazine, and in step S802, there is a check whether it is a separation card. If not, the card is output to the card channel together with the card type information in step S804. The method then returns to step S800. If, in step S802, it is determined that the card is a separation card, further drawing of cards from the involved magazine is prevented in step S806. The steps S800 through S804 are performed in parallel for each magazine when drawing a card from the same. Furthermore, step S808 checks whether the separation cards have been detected for all card types. If this is the case, the final processing of the still present cards in the system is performed in step S810, and subsequently, the system is driven empty and/or stopped. The cards (if any) for the next job remain in the magazines.

Figure 8B:
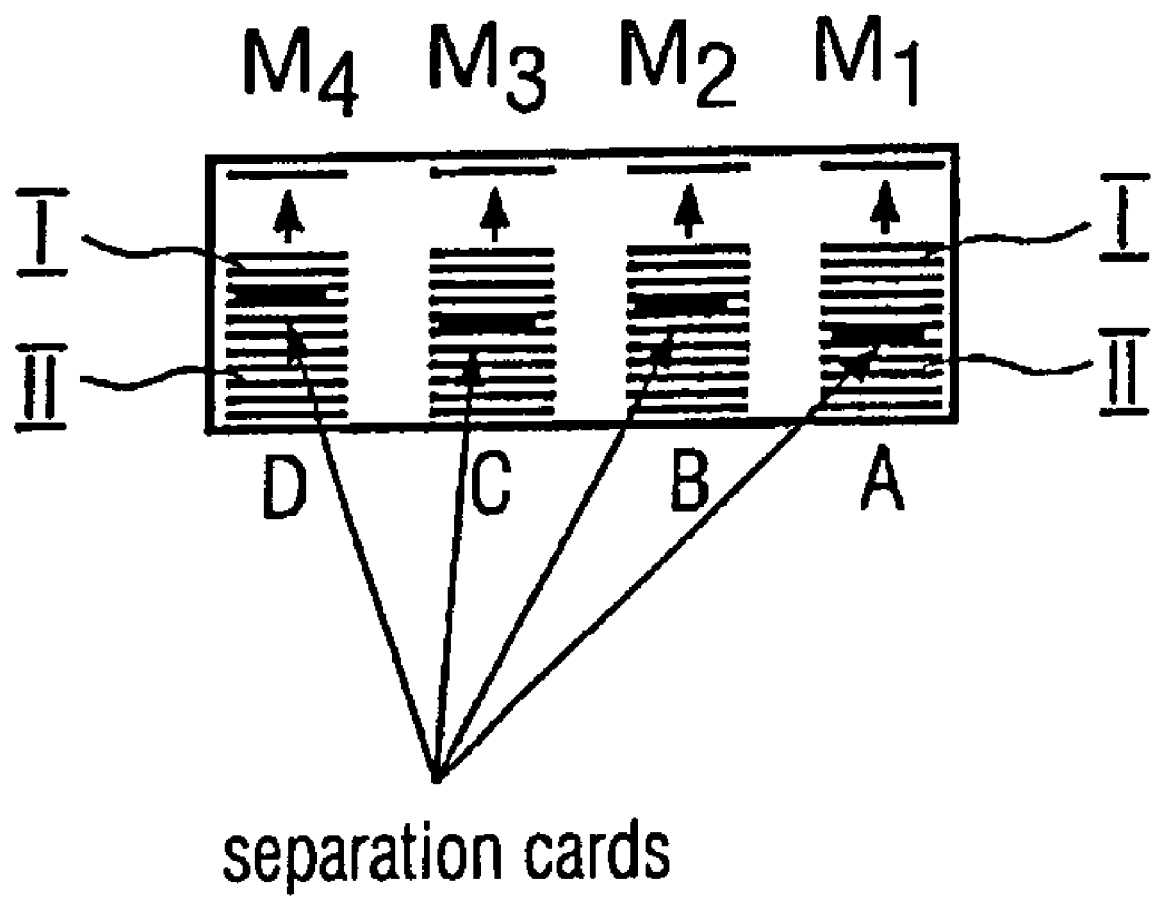

FIG. 8B shows the arrangement of the separation cards in the magazines $M_1$ to $M_4$ according to this embodiment. As can be seen, the separation cards are arranged in different positions in the various magazines and separate the cards associated with job I from the cards associated with job II.

Although the preferred embodiments of the present invention have been described above with respect to embodiments in which certain information regarding the card types were named, it is obvious for someone skilled in the art that other information regarding the used cards may also be used in addition or alternatively.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for providing cards to be applied to a carrier, wherein the cards are arranged in a plurality of card magazines and may be drawn from the plurality of card magazines, wherein cards of a known card type are arranged in a card magazine, and wherein information regarding the card type is associated with the card magazine, the method comprising:
   (a) reading the carrier, the carrier containing data about the card type to be applied to the carrier;
   (b) receiving information specifying the card type of the card to be drawn on the basis of the data read from the carrier;
   (c) on the basis of the received information, selecting at least one of the plurality of card magazines;
   (d) drawing a card from the at least one selected card magazine; and
   (e) outputting the card drawn from the at least one selected card magazine for subsequent processing together with the information about the card type associated with the at least one selected card magazine from which the card is drawn to allow control of the subsequent processing based on the outputted information.

2. The method of claim 1, wherein the carrier further contains data about a number of the cards to be provided.

3. The method of claim 1, wherein the steps (d) and (e) are performed sequentially for the card magazines.

4. The method of claim 1, wherein cards of a first card type are arranged in a first number of card magazines and cards of a second card type are arranged in a second number of card magazines, wherein, in step (d), a card from at least one magazine of the first number and a card from at least one card magazine of the second number are drawn in parallel.

5. The method of claim 1, wherein a drawn card is read before outputting it, wherein the method further comprises:
   based on the information read from the card, accessing a database; and
   based on the information from the database, drawing and forwarding further cards.

6. The method of claim 5, wherein a carrier is generated based on the information from the database, and subsequently the card and the further cards, if any, are connected to the carrier.

7. The method of claim 1, wherein the information regarding the card type includes information on the card material, a card embossing and/or a storage medium on the card.

8. The method of claim 7, wherein the information regarding the card type includes information on a storage medium on the card indicating the presence of a storage medium and the storage medium type so that, in subsequent processing, a suitable card reader may be activated depending on the indicated storage medium type.

9. A device for providing cards to be applied to a carrier, the device comprising:
   a plurality of card magazines for receiving cards, wherein cards of a known card type are arranged in a card magazine, and wherein information regarding the card type is associated with the card magazine;
   a drawing unit for drawing a card from at least one card magazine;
   a card output for outputting the card;
   a data output;
   a data input; and
   a controller, the controller being configured to
      receive at the data input information about the card type to be applied to the carrier, the information being determined on the basis of data read from the carrier;
      select on the basis of the received information at least one of the plurality of card magazines,
      control the drawing unit to draw a card from the at least one selected card magazine,
      control the card output to output the card drawn from the at least one selected card magazine for subsequent processing, and
      output the information about the card type associated with the at least one selected card magazine from which the card is drawn via the data output to allow control of the subsequent processing based on the outputted information.

10. The device of claim 9, wherein the drawing unit is configured to draw the cards sequentially from the card magazines.

11. The device of claim 9, wherein cards of a first card type are arranged in a first number of card magazines and cards of a second card type are arranged in a second number of card magazines, wherein the drawing unit is configured to draw a card from at least one card magazine of the first number and a card from at least one card magazine of the second number in parallel.

12. The device of claim 9, having a reader for reading a drawn card and having a processor configured to access a database based on the information read from the card, and to drive the drawing unit and the output for drawing and forwarding further cards based on the information from the database.

13. The device of claim 9, wherein the information regarding the card type includes information on the card material, a card embossing and/or a storage medium on the card.

14. A method for applying a card to a card carrier, wherein a plurality of cards are arranged in a plurality of card magazines, wherein cards of a known card type are arranged in a card magazine, wherein information specifying the card type is associated with the card magazine, the method comprising:
   (a) reading the carrier, the carrier containing data about the card type to be applied to the carrier;
   (b) receiving information specifying the card type of the card to be drawn on the basis of the data read from the carrier;
   (c) on the basis of the received information, selecting at least one of the plurality of card magazines;

(d) drawing a card from the at least one selected card magazine; and
(e) outputting the card drawn from the at least one selected card magazine to a card channel for subsequent processing together with the information about the card type associated with the at least one selected card magazine from which the card is drawn to allow control of the subsequent processing based on the outputted information, wherein the card channel has a plurality of sensors for reading cards;
(f) configuring the card channel by activating/deactivation the sensors on the basis of the outputted information; and
(g) outputting the card from the card channel to an applier for connecting the card to the card carrier.

15. A device for applying a card to a card carrier, comprising:
a card feeder, comprising
a plurality of card magazines for receiving cards, wherein cards of a known card type are arranged in a card magazine, and wherein information regarding the card type is associated with the card magazine;
a drawing unit for drawing a card from at least one card magazine;
a card output for outputting the card;
a data output;
a data input; and
a controller, the controller being configured to
receive at the data input information about the card type to be applied to the carrier, the information being determined on the basis of data read from the carrier;
select on the basis of the received information at least one of the plurality of card magazines,
control the drawing unit to draw a card from the at least one selected card magazine,
control the card output to output the card drawn from the at least one selected card magazine for subsequent processing, and
output the information about the card type associated with the at least one selected card magazine from which the card is drawn via the data output to allow control of the subsequent processing based on the outputted information;
a card channel, comprising
a plurality of sensors for reading cards,
a card input for receiving a card from the card feeder,
a data input for receiving the information specifying the card type of the card from the card feeder, wherein the card channel is configured by activating/deactivation the sensors on the basis of the received information, and
a card output; and
an applier for connecting the card received from the card channel to the card carrier.

* * * * *